H. GEISENHÖNER.
ELECTRIC HEATING APPARATUS.
APPLICATION FILED JUNE 21, 1920.
1,406,551.
Patented Feb. 14, 1922.
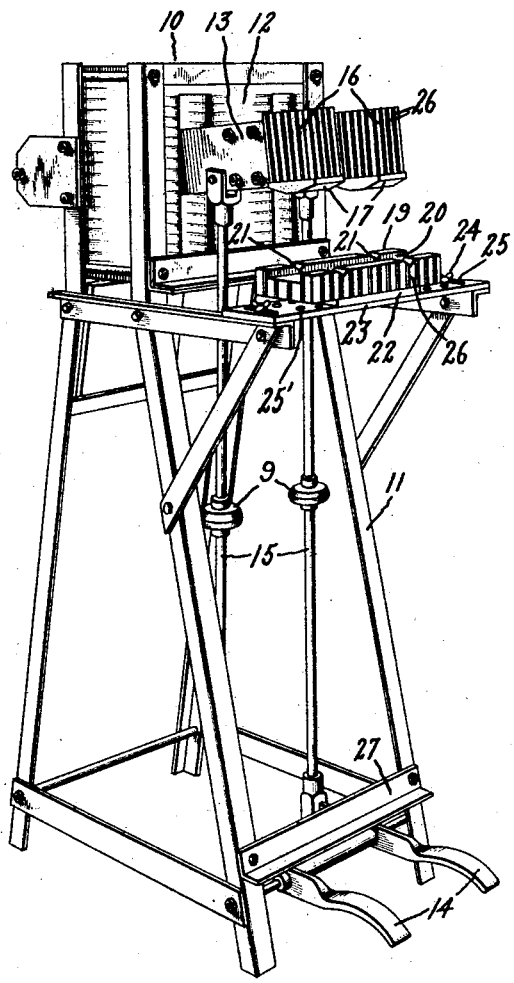
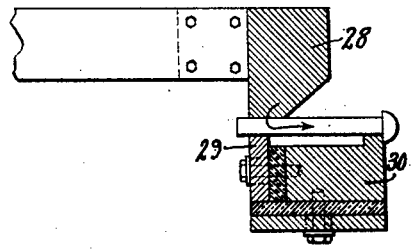
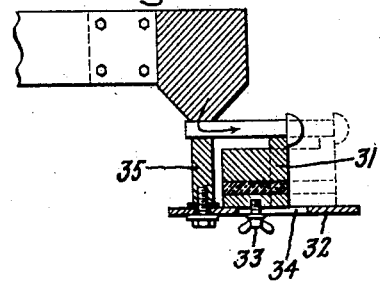
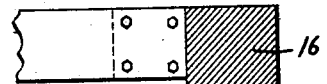
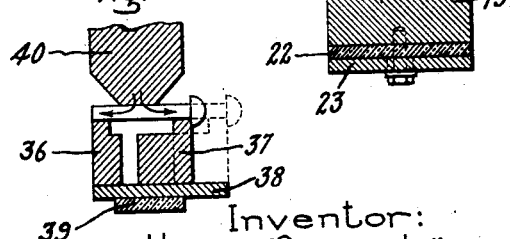
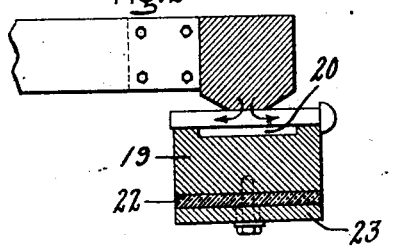
Inventor:
Henry Geisenhöner,
by Albert G. Davis
His Attorney

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

ELECTRIC HEATING APPARATUS.

1,406,551.  Specification of Letters Patent.  Patented Feb. 14, 1922.

Application filed June 21, 1920. Serial No. 390,508.

*To all whom it may concern:*

Be it known that I, HENRY GEISENHÖNER, a citizen of the United States, residing at Schenectady, in the county of Schenectady, State of New York, have invented certain new and useful Improvements in Electric Heating Apparatus, of which the following is a specification.

This invention relates to electrical heating apparatus and more particularly to that type wherein articles are heated by the passage of an electric current therethrough.

Heretofore it has been the practice in heating small articles such as rivets, bolts and the like to place the article in an upright position between an upper and lower electrode, the current generally passing from one end of the article to the other. An apparatus performing the heating operation according to this method is illustrated in my United States Letters Patent No. 1,323,751, dated December 2, 1919. I have found that in many instances it is desirable to change the manner of applying the current to the article from that above indicated and I have therefore devised a new improved apparatus for accomplishing this result.

An object of my invention is to provide an apparatus which shall enable rivets and the like to be heated uniformly throughout without danger of burning or upsetting the points that are to be inserted in the holes.

A further object of my invention is to provide a simple and compact apparatus capable of rapid manipulation in which electric contact shall be made with the side rather than the point of the article to be heated.

A further object of my invention is to provide a practical apparatus for heating rivets and the like in series without making electric contact with the ends of the rivets.

A further object of my invention is to provide an apparatus for heating articles of the class described in which the point of application of the heat to the article to be heated shall be capable of ready adjustment, whereby the distribution of the heat throughout the article to be heated can be nicely controlled.

My invention will be better understood from the following description taken in connection with the accompanying drawing, and its scope will be pointed out in the appended claims.

Referring to the drawing, Fig. 1 is a perspective view of heating apparatus embodying my invention; Fig. 2 is a detail section of the fixed and movable electrodes; Fig. 3 is a view similar to Fig. 2 but showing a rivet held in a different position; Figs. 4, 5 and 6 are detail sections of modified forms of the electrodes.

Referring to Fig. 1, a transformer 10 supported on a frame 11 is provided with a primary winding 12 and a secondary winding which comprises two pivotal bars 13. These bars are independently movable from pedals 14 through the medium of connecting rods 15. Interposed in each connecting rod is a joint 9 which serves to insulate the upper ends of the rods from the frame 11. At the outer end of each bar is a block 16 of metal formed with a lower beveled face 17. The blocks 16 form the movable electrodes of the apparatus and are adapted to cooperate through the agency of articles to be heated with the stationary electrode 19. The electrode 19 consists of a bar having a longitudinal channel 20 the sides of which are provided with notches 21 to assist in holding the articles. This electrode is mounted upon the insulating block 22 which in turn is carried upon a shelf or cross piece 23. Wing bolts 24 passing through slots 25 in the ends of the shelf 23 serve to secure the shelf adjustably to the frame 11. Openings 25' in the shelf 23 permit the circulation of air around the electrode and corrugations 26 formed in the sides of the electrodes increase their heat radiating surface. Fig. 1 shows the electrodes 16 raised, although by reason of their weight they normally occupy a position in close proximity to the stationary electrode 19. An angle bar 27 secured to the lower part of the frame 11 serves as a stop to prevent the pedals 14 from permitting the electrodes 16 to fall into contact with the electrode 19.

When it is desired to heat rivets by the apparatus above described, the electrodes are raised by the pedals 14 to the position shown in Fig. 1 and the rivets are placed upon the stationary electrode 19 across the channel 20. As shown in Fig. 2, one rivet is placed under each of the movable electrodes. The pedals are then released and the movable electrodes drop into contact with the rivets. The current generated in the secondary of the transformer passes from one of the movable electrodes 16 through the rivet to the stationary electrode 19, thence through the stationary electrode and the other rivet to the other movable electrode. It will be seen therefore that the two rivets are in series in the circuit. As shown in Fig. 2 of the drawing, the contact surface of the movable electrode is positioned midway of the width of the channel 20. The current therefore on leaving the electrode 16 divides and passes through the rivet in opposite directions in the manner indicated by the arrows. By properly adjusting the position of the stationary electrode 19 the movable electrode may be made to contact with the rivet nearer to one end than the other so that a greater heating current may flow through one portion of the rivet than through the other portion. In this way the heating may be distributed throughout the rivet in any desired manner to bring all parts thereof to the desired temperature.

The notches 21 shown in electrode 26 of Fig. 1 are not essential and in many cases may be omitted with advantage, since the scale which accumulates at the contact surfaces may be more readily removed from a flat surface. Moreover, the accumulation of scale will not be so rapid on a flat surface, since the articles to be heated do not then always make contact with the electrodes at the same point.

Articles which are considerably longer than the rivet shown in Fig. 2 may be heated by placing the same across channel 19 at varying angles thereto and portions of long metal bars may also be heated in a similar manner.

It will be obvious to those skilled in the art that the electrode construction which I have disclosed permits of interposing the articles to be heated between the electrodes so as to make end contact therewith as in my Letters Patent No. 1,323,751 heretofore referred to. This method of using the device is shown in Fig. 3.

The idea of a secondary winding comprising electrode carrying bars independently movable in the windows of the transformer core is claimed in the copending application of Edgar F. Collins, Serial No. 325,656, filed September 23, 1919, assigned to the assignee of this application.

In the form of my invention shown in Fig. 4 the rivet is supported at its inner end between the movable electrode 28 and an insulated metal block 29 while its outer end bears against the stationary electrode 30. A second rivet also bears against the electrode 30 and is held between the other movable electrode and an insulated block of metal similar to the block 29. The current therefore in leaving one of the electrodes passes through the rivet as indicated by the arrow, thence through the stationary electrode 30 and the other rivet to the other movable electrode.

Fig. 5 represents a modified construction of the type of heater represented by Fig. 4. In Fig. 5, the supporting blocks 35 are mounted upon the plate 32 independently of the electrode 31. Blocks 35 and electrode 31 are insulated from the shelf member 32 as indicated in the drawing and wing bolts 33 passing through slots 34 in the supporting shelf 32 permit of the electrode 31 being readily adjusted with respect to the blocks 35, whereby rivets of various lengths may be more efficiently heated than they can be heated in the arrangement shown in Fig. 4.

Fig. 6 shows a modified construction of the arrangement shown in Fig. 1, in order more readily to accommodate rivets of various lengths. In Fig. 6 the electrodes 36 and 37 are mounted on the conducting base 38 which is insulated in any convenient manner from the supporting shelf, such insulation being indicated at 39. In this arrangement, current is conducted into a rivet from an electrode indicated at 40, and the current flows in two paths through the rivet as indicated by the arrows. The current flowing in one path passes from the rivet to electrode 36 and thence to the other rivet which is clamped between another movable electrode and electrodes 36 and 37 in the same manner that the rivet shown is clamped. The current flowing through the other path enters the electrode 37 and passes to the other rivet in like manner. In this manner the two rivets are heated in series, the current passing from one electrode by two paths through one of the articles to be heated and thence by two paths through another article to be heated to another electrode. To adapt the device for heating articles of different lengths the electrode 37 is made adjustable along the base 38 to vary its distance from the electrode 36. In this manner means are provided for varying the width of the channel of the channelled member comprising the electrodes 36 and 37. Any well-known means may be provided for adjusting the electrode 37 along the base 38 and my invention is not limited as to the details of this adjusting mechanism which may comprise slots and wing bolts as shown in Fig. 5, or grooves into which projections on the member 37 engage.

The supporting shelves of Figs. 4, 5 and 6 are adjustably mounted with respect to the frame of the apparatus just as the shelf 23 is adjustably mounted in Fig. 1 in order to vary the point of contact of the movable electrodes with the articles to be heated for the purpose heretofore set forth.

What I claim as new and desire to secure by Letters Patent of the United States, is:

1. In a device for heating articles by passing an electric current therethrough, an electrode adapted to be moved into contact with the article to be heated, and means for holding said article and making electrical contact therewith, said means being adjustable to vary the point of contact of the movable electrode with the article.

2. In a device for heating a plurality of articles by passing an electric current therethrough in series, a pair of electrodes adapted to be moved into contact with the articles to be heated, and means adapted to be interposed in the heating circuit between two of the articles and constructed to support the article and form an electrical contact therewith and being adjustable to vary the points of contact of the movable electrodes with the articles.

3. In an electric heating apparatus, the combination of the primary of a transformer and a heating circuit comprising two movable arms forming portions of the secondary circuit of said transformer and electrodes carried by said arms and adapted to move into contact with the articles to be heated and a conducting bed interposed in said heating circuit and adapted to support the articles at a plurality of spaced points during the heating operation.

4. In an electric heating apparatus, the combination of the primary of a transformer and a heating circuit comprising two movable arms forming portions of the secondary circuit of said transformer and electrodes carried by said arms and adapted to be moved into contact with the articles to be heated and a conducting bed interposed in said heating circuit and adapted to support the articles during the heating operation, said bed being adjustable to vary the points of contact of said electrodes with the articles.

5. An apparatus for electrically heating articles of the class described comprising a pair of electrodes arranged to make side contact with an article to be heated, means whereby one of said electrodes may be moved to and from the other to permit insertion and removal of the articles to be heated, one of said electrodes being constructed to provide a plurality of spaced surfaces for engaging the article to be heated and means whereby one of said electrodes may be adjusted relatively to the other to vary the current path through the article to be heated.

6. In an apparatus of the class described a combined electrode and article holder comprising a channelled member and means for varying the width of the channel.

7. An apparatus for electrically heating articles of the class described comprising a stationary electrode upon which the article to be heated is adapted to be supported, said electrode being constructed to support said article at a plurality of spaced points, and a cooperating relatively movable electrode arranged to engage the side of said article at a distance along the length of the article from one of said points and conduct current longitudinally of said article to heat the same.

8. An apparatus for electrically heating articles of the class described, comprising a pair of electrodes adapted to make electric contact with the articles to be heated and means upon which the articles to be heated are adapted to be supported provided with a channel-shaped contact face in cooperative relationship to each electrode arranged to complete a circuit from one electrode by two paths through an article to be heated and thence by two paths through another article to be heated to the other electrode.

9. An apparatus for electrically heating articles of the class described, comprising a stationary electrode upon which the articles to be heated are adapted to be supported, a plurality of electrodes arranged to be moved relatively to said stationary electrode and adapted respectively to engage said articles and conduct current thereto, characterized by the fact that said electrodes are constructed and arranged to engage the sides of the articles to be heated and conduct current through a plurality of said articles in series.

In witness whereof, I have hereunto set my hand this 18th day of June, 1920.

HENRY GEISENHÖNER.